(12) United States Patent
Abe et al.

(10) Patent No.: US 7,629,401 B2
(45) Date of Patent: Dec. 8, 2009

(54) ANTISTATIC COMPOSITION

(75) Inventors: Tetsuji Abe, Tokyo (JP); Hiroaki Shirai, Tokyo (JP); Takayuki Tsuda, Tokyo (JP)

(73) Assignee: Adeka Corporation, Tokyo (JP)

( * ) Notice: Subject to any disclaimer, the term of this patent is extended or adjusted under 35 U.S.C. 154(b) by 316 days.

(21) Appl. No.: 11/885,674

(22) PCT Filed: Mar. 9, 2006

(86) PCT No.: PCT/JP2006/304593

§ 371 (c)(1),
(2), (4) Date: Sep. 5, 2007

(87) PCT Pub. No.: WO2006/098214

PCT Pub. Date: Sep. 21, 2006

(65) Prior Publication Data

US 2008/0176979 A1    Jul. 24, 2008

(30) Foreign Application Priority Data

Mar. 14, 2005  (JP) .............................. 2005-071090

(51) Int. Cl.
*C08K 5/521* (2006.01)
*C08K 5/06* (2006.01)
*C08K 5/09* (2006.01)

(52) U.S. Cl. ................... 524/145; 524/147; 524/151; 524/284; 524/369; 524/910; 252/8.91

(58) Field of Classification Search ................ 524/145, 524/147, 369, 910; 252/8.91
See application file for complete search history.

(56) References Cited

U.S. PATENT DOCUMENTS 3,341,343 A * 9/1967 Beiswanger et al. ... 106/169.14

RE28,212 E * 10/1974 Grosjean .................... 260/857
2004/0169290 A1 * 9/2004 Takei et al. ................. 257/783

FOREIGN PATENT DOCUMENTS

| JP | 11-244609 | | 9/1999 |
|---|---|---|---|
| JP | 02000226507 A | * | 8/2000 |
| JP | 2002-060734 | | 2/2002 |
| JP | 2002-348564 | | 12/2002 |
| JP | 2004-305882 | | 11/2004 |

* cited by examiner

*Primary Examiner*—Tae H Yoon
(74) *Attorney, Agent, or Firm*—Wenderoth, Lind & Ponack, L.L.P.

(57) ABSTRACT

The present invention provides an antistatic composition including: a polymer (A) containing a monomer unit represented by the following general formula (1):

[Chemical formula 1]

$$\left[ \begin{array}{c} \underset{R^1}{\bigcirc}\!-\!CH_2\!-\!\\ O\!-\!(CH_2\!-\!CH_2\!-\!O)_m\!-\!(CH_2\!-\!\underset{A}{CH}\!-\!O)_n\!-\!H \end{array} \right]_p$$

(1)

where $R^1$ represents a hydrocarbon group having a benzene ring, A represents a methyl group or an ethyl group, and a plurality of A's may be the same or different from each other, m and n, each of which is an average polymerization degree of an oxyalkylene group, each represent a numeral of 1 or more, and p represents a numeral of 2 or more; and a low-molecular-weight anionic compound (B).

10 Claims, No Drawings

ANTISTATIC COMPOSITION

TECHNICAL FIELD

The present invention relates to an antistatic composition, which has superior thermal-resistance properties, reacts minimally with synthetic resins, and shows excellent instantaneous effect and persistence.

BACKGROUND ART

Synthetic resins are lightweight and can be easily processed, while having such excellent characteristic features that substrates can be designed according to the application. Thus, synthetic resins are currently indispensable and important materials used in a wide range of fields. One of the important characteristic features of the synthetic resins is high electric-insulating properties. Therefore, synthetic resins have been frequently used for various components of electric products. However, because of their excellent electric-insulating properties, there is a problem in that the products can become electrified through friction or the like.

Electrified resins have a problem in that they draw surrounding dirt and dust, spoiling their appearance. In addition, in electric products, such as computers and other precision instruments, there are cases where electrification leads to abnormal circuit operation. Further, there is a problem due to electric shock. Electric shock passed from resin to the human body causes an unpleasant feeling. In addition, the resin may induce an explosion in the presence of inflammable gas or dust particulates. Therefore, in order to solve such a problem, resins are generally subjected to an electrification-prevention process; a commonly known, a method being to add an antistatic agent to the synthetic resin. Antistatic agents can be roughly divided into permanent antistatic agents that copolymerize antistatic units within resin molecules, and kneading-type antistatic agents added during the processing fabrication of a resin. Of these, the cheap and easily processable kneading-type antistatic agents have been widely used.

The kneading-type antistatic agent demonstrates an effect when it bleeds out onto the surface of the synthetic resin. However, there is a problem in that the persistence of the antistatic effect is insufficient as a result of its removal from the surface of the resin through friction and washing with water and the like. In addition, if the antistatic agent has poor compatibility with the synthetic resin, the antistatic agent inside the resin quickly bleeds out onto the surface thereof, thereby causing a problem in that it loses its effect within several days or weeks.

For improving such persistence, polymeric antistatic agents have been studied. For example, Patent Document 1 discloses, in the presence of 5 to 80 parts by weight (parts by mass) (as calculated by solid components) of diene-based copolymer latex including 50 percent by weight (percent by mass) or more of conjugated diene-based monomer (A), an antistatic resin composition that includes:

100 parts by weight (parts by mass) of a resin composed of (A) 10 to 100 percent by weigh (percent by mass) of a graft copolymer obtained by graft copolymerization of 5 to 100 percent by weight (percent by mass) of a monomer represented by the following general formula (1):

[Chemical formula 1]

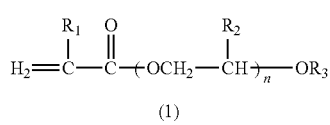

(1)

where $R_1$, $R_2$ and $R_3$ each represent a hydrogen atom or an alkyl group having 1 to 4 carbon atoms and n represents an integer of 3 to 50 with 95 to 20 parts by weight (parts by mass) of a monomer composition made of 95 to 0 percent by weight (percent by mass) of at least one monomer selected from the group consisting of aromatic vinyl compounds, methacrylate esters, acrylate esters, and vinyl cyan compounds, and (B) 90 to 0 percent by weight (percent by mass) of a thermoplastic resin having compatibility with the above graft copolymer, where the percentage of the diene copolymer is 5 to 30 percent by weight (percent by mass); and 0.05 to 10 parts by weight (parts by mass) of a sulfonic-acid monovalent metal salt or a carboxylic-acid monovalent metal salt of an alkyl fluoride-containing compound having at least one perfluoroalkyl group represented by the following general formula (2):

where Rf represents a perfluoroalkyl group having 4 to 15 carbon atoms, X represents —$SO_3$— or —COO—, and M represents a monovalent metal.

In addition, Patent Document 2 discloses a thermoplastic resin composition including: (A) 1 to 50 parts by weight (parts by mass) of polyether esteramide having a polyether ester unit of 95 to 10 percent by weight (percent by mass), composed of (a) an aminocarboxylic acid or lactam having 6 or more carbon atoms, or diamine and dicarboxylic acid salts having 6 or more carbon atoms, (b) poly(alkylene oxide) glycol having a number-average molecular weight of 200 to 6,000, and (c) dicarboxylic acid having 4 to 20 carbon atoms; (B) 99 to 50 parts by weight (parts by mass) of a polycarbonate resin; and (C) 0 to 49 parts by weight (parts by mass) of a styrene-based thermoplastic resin, which are mixed so that the total amount of (A)+(B)+(C) is 100 parts by weight (parts by mass).

Furthermore, Patent Document 3 discloses a polymeric antistatic agent represented by the general formula (1):

[Chemical formula 2]

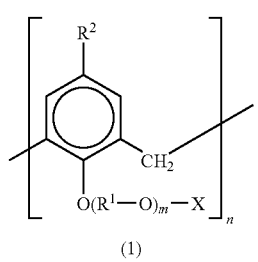

(1)

where $R^1$ represents a hydrocarbon group, $R^2$ represents a hydrogen atom or a hydrocarbon group, or a hydrocarbon group or a hydrophilic group having an ester group, m represents a numeral of 1 or more, and n represents a numeral of 2 or more. In addition, paragraph of Patent Document 3 describes that "In the general formula (1), $R^1$ is a hydrocarbon group, preferably an alkylene group having 2 to 4 carbon atoms. A $(R^1—O)_m$ portion can be obtained by addition polymerization of alkylene oxide or the like, such as ethylene oxide, propylene oxide, butylene oxide, α-olefin oxide or styrene oxide. In the case of forming the $(R^1—O)_m$ portion by the addition of alkylene oxide or the like, $R^1$ is determined by the kind of alkylene oxide or the like to be added. The polymerization of the alkylene oxide or the like to be added is not limited to any particular configuration and may be a homo-polymerization of one kind of alkylene oxide or the like, or a random copolymerization, block copolymerization, random/block copolymerization, or the like, of two or more kinds of alkylene oxides or the like. $R^1$ is most preferably an ethylene group. When $R^1$ includes two or more different groups, one of those is preferably an ethylene group". In addition, paragraph [0009] describes that "$R^2$ represents a hydrogen atom or a hydrocarbon group. Examples of the hydrocarbon groups include an alkyl group, an alkenyl group, an aryl group, a cycloalkyl group and a cycloalkenyl group".

Furthermore, as an antistatic composition that satisfies both persistence and instantaneous effect, Patent Document 4 discloses an antistatic composition specifically containing: a polymer (A) that contains a monomer unit represented by the following general formula (1):

[Chemical formula 3]

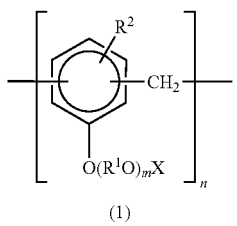

(1)

where $R^1$ represents an alkylene group, $R^2$ represents a hydrogen atom, a halogen atom or a hydrocarbon group, X represents a hydrogen atom, a hydrocarbon group, an isocyanate residue, a hydrocarbon group having an ester group, or an anionic hydrophilic group, and m represents a numeral of 1 or more; and a low-molecular weight anionic organic compound (B). In addition, paragraph [0012] of Patent Document 4 describes that "In the above general formula (1), the $(R^1$—$O)_m$ portion can be obtained by addition polymerization of phenol or phenol having a substituent to alkylene oxide or the like, such as ethylene oxide, propylene oxide, butylene oxide, tetrahydrofuran (1,4-butylene oxide), long-chain α-olefin oxide, or stylene oxide. In the case of forming the $(R^1$—$O)_m$ portion by addition polymerization of alkylene oxide or the like, the kind of $(R^1$—$O)$ is determined by the kind of alkylene oxide or the like to be added. The polymerization of alkylene oxide or the like to be added is not limited to any particular configuration and may be a homo-polymerization of one kind of alkylene oxide or the like, or a random copolymerization, block copolymerization, random/block copolymerization, or the like, of two or more kinds of alkylene oxides or the like. If the $(R^1$—$O)_m$ portion is polyalkylene oxide, $R^1$ is an alkylene group, preferably an alkylene group having 2 to 4 carbon atoms, most preferably an ethylene group. In addition, if the $(R^1$—$O)_m$ portion is formed by copolymerization of two or more alkylene oxides or the like, one of those is preferably ethylene oxide".

Patent Document 1: Japanese Patent Laid-Open No. 63-101444, Claims

Patent Document 2: Japanese Patent Laid-Open No. 62-273252, Claims

Patent Document 3: Japanese Patent Laid-Open No. 2000-34330, Claims, [0008] and [0009]

Patent Document 4: Japanese Patent Laid-Open No. 2002-60734, Claims, [0012]

DISCLOSURE OF THE INVENTION

Problems to be solved by the Invention

However, (meta)acrylic resin having a polyoxy alkylene chain as disclosed in Patent Document 1 shows low thermal-resistance, so it cannot be used in a synthetic resin having a high melting point. In addition, polyether ester amide as disclosed in Patent Document 2 has improved but insufficient thermal-resistance properties, so there has been a problem in that it can only be used in styrene-based resins because of its poor compatibility with general synthetic resins.

Furthermore, a polymeric antistatic agent as described in Patent Document 3 is made of only a polyalkylene glycol derivative having a phenol resin skeleton. In addition, the example of Patent Document 3 only discloses a polyalkylene glycol derivative having a phenol resin skeleton in which $R^2$ of the general formula (1) in Patent Document 3 is an alkyl group. The compatibility and thermal-resistance of polymeric antistatic agents made of those polyalkylene glycol derivatives are improved as compared with the conventional polymer-type antistatic agents. However, there is a problem in that, when it is mixed for a long time with a synthetic resin having an ester bond or the like at high temperatures, it reacts with the synthetic resin to accelerate the decomposition of the synthetic resin. In addition, there is another problem in that it shows insufficient thermal-resistance properties, no instantaneous effect, and poor initial antistatic effect even though it has excellent persistence.

Furthermore, an antistatic composition provided as a combination of a polyalkylene glycol derivative (polymer A) having a phenol resin skeleton, as disclosed in Patent Document 4, with a low-molecular-weight organic anion compound has a problem in that, depending on the kind of alkylene-glycol addition to the polyalkylene glycol derivative having the phenol resin skeleton, the derivative may react with the synthetic resin with which it is to be mixed. Furthermore, the antistatic composition shows insufficient thermal resistance when the substituent ($R^2$) of the phenol compound is a hydrogen atom or a halogen atom. Even if the substituent is hydrocarbon, it is found that the antistatic composition shows insufficient thermal resistance, except in the case of having a specific structure. Furthermore, the antistatic composition of Patent Document 4 has both persistence and instantaneous effect of the antistatic property, but has been made without consideration to the problems in thermal-resistance property and reactivity with the resin to be mixed.

Therefore, an object of the present invention is to provide a kneaded-type antistatic composition that does not react with a synthetic resin even when mixed at a high temperature, and has both persistence and instantaneous effect of the antistatic property.

Means for Solving the Problems

Thus, the inventors of the present invention have conducted intensive studies and found a combination of a polyalkylene glycol derivative having a phenol resin skeleton with a specific structure and a low-molecular-weight anionic organic compound, thereby attaining the present invention.

That is, the antistatic composition according to the present invention includes:

a polymer (A) containing a monomer unit represented by the following general formula (1):

[Chemical formula 4]

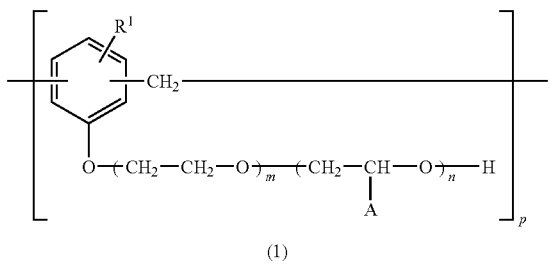

(1)

where $R^1$ represents a hydrocarbon group having a benzene ring, A represents a methyl group or an ethyl group, and a plurality of A's may be the same or different from each other, m and n, each of which is an average polymerization degree of an oxyalkylene group, each represent a numeral of 1 or more, and p represents a numeral of 2 or more; and a low-molecular-weight anionic compound (B).

Effect of the Invention

An effect of the present invention is in providing a macromolecular antistatic composition which shows high thermal resistance, reacts minimally with synthetic resins and has both persistence and instantaneous effectivity.

BEST MODE FOR CARRYING OUT THE INVENTION

A polymer (A) containing a monomer unit represented by the general formula (1) of the present invention is specifically a polymer containing as a monomer unit a compound prepared by adding a particular alkylene oxide to a product obtained by dehydration-condensation between a phenol compound having a substituent containing a benzene ring and formaldehyde.

Next, the polymer (A) will be described in more detail.

In the general formula (1), the $(-CH_2CH_2-O-)_m$ (ethylene oxide) portion can be obtained by, for example, adding ethylene oxide to the hydroxyl group of a phenol compound having a substituent containing a benzene ring. The suffix "m" represents an average polymerization degree of ethylene oxide, which is a numeral of 1 or more, preferably 1 to 200, more preferably 5 to 100, still more preferably 5 to 50, and most preferably 8 to 40.

The $(-CH_2CHA-O-)_n$ (A represents a methyl group or an ethyl group) portion can be obtained by the addition of an alkylene oxide having 3 to 4 carbon atoms after the addition of the ethylene oxide. Specific examples of alkylene oxide include propylene oxide and butylene oxide. Those alkylene oxides may be used independently or in combinations of two or more in block polymerization or random polymerization or the like. However, it is preferable to use propylene oxide or butyl oxide alone for simplicity in the production method. The suffix "A" represents a methyl group when propylene oxide is used, or an ethyl group when butylene oxide is used. The suffix "n" represents an average polymerization degree of those alkylene oxides, which is a numeral of 1 or more, preferably 1 to 100, more preferably 3 to 50, and further preferably 3 to 30.

$R^1$ represents a hydrocarbon group containing a benzene ring, such as a phenyl group, tolyl group, benzyl group, xylyl group, phenethyl group, styryl group, trimethylphenyl group, cumenyl group, cumyl group, hydrocinnamyl group, cinnamyl group, tetramethylphenyl, thymyl group, carbacryl group, cuminyl group, neophyl group, xenyl group, benzhydryl group, triphenylmethyl group, ethylphenyl group, propylphenyl group, butylphenyl group, pentylphenyl group, hexylphenyl group, heptylphenyl group, octylphenyl group, nonylphenyl group, decylphenyl group, undecylphenyl group, dodecylphenyl group or napthyl group. Of those, in terms of miscibility or compatibility with a synthetic resin and heat-resistance properties, the phenyl group, the cumyl group, and the phenethyl group are preferable as $R^1$. Examples of phenols containing such groups include o-phenylphenol, m-phenylphenol, p-phenylphenol, benzyl phenol, p-cumylphenol and styrenated phenol.

The polymer (A) containing the monomer unit represented by the general formula (1) can be obtained by condensation of phenols, each having a substituent $R^1$ with formaldehyde, and then adding alkylene oxide, by a known method. In addition, the polymer (A) is a condensation product having at least two or more monomer units represented by the general formula (1), that is, q in the general formula (1) is 2 or more, preferably 3 to 50.

Furthermore, when phenols having a substituent $R^1$ are condensed with formaldehyde, an additional condensable compound can also be added to the condensation. Examples of other condensable compounds include phenols, resorcin, catechol, hydroquinone and anisole. The condensation degree of the polymer (A) when copolymerized only needs to be 2 or more, but preferably is 3 to 100, more preferably 3 to 80, and further preferably 5 to 50. When the condensation degree exceeds 100, the viscosity of the product increases, so there are cases where inconvenience may be caused in handling or it becomes difficult to knead the polymer into a synthetic resin.

In the polymer (A) containing the monomer unit represented by the general formula (1), the percentage of the monomer unit represented by the general formula (1) is not specifically limited. However, when the percentage is small, the antistatic composition obtained barely produces a sufficient effect. To produce a sufficient effect, a large amount needs to be added to the resin, leading to cases in which a decrease in physical properties such as the strength of the synthetic resin are seen. For this reason, the percentage of the monomer unit represented by the general formula (1) is preferably 30 percent by mass or more, more preferably 50 percent by mass or more, still more preferably 70 percent by mass, further preferably 90 percent by mass or more, and most preferably 100 percent by mass with respect to the total amount of the polymer (A). To produce the polymer (A) in which the percentage of the monomer unit represented by the general formula (1) is 100 percent by mass, phenols having one or two or more different $R^1$'s as substituents may be condensed with formaldehyde, and then ethylene oxide and alkylene oxide added in the order represented in the general formula (1).

Next, is a description of the reaction of an antistatic composition with a synthetic resin.

Of the synthetic resins, those having an ester bond or an amino bond, such as a polyester resin, a polycarbonate resin or a polyamide resin, are known to cause an exchange reaction, such as an ester exchange reaction, when coming into contact at high temperature with a group having an active hydrogen, such as a hydroxyl group, a phosphate group, a carboxylic acid group or an amino group, thereby causing decomposition and deterioration of the synthetic resin. Antistatic agent having an active hydrogen group have been conventionally known to have such a disadvantage. The active hydrogen group shows a positive effect on antistatic performance, so the absence of such active hydrogen groups may lead to a decrease in antistatic effect. Thus, the inventors of the present invention have found that among active hydrogen groups, a secondary hydroxyl group causes hardly any exchange reaction with the synthetic resin and that the secondary hydroxyl group also shows excellent antistatic effect. The polymer (A) containing the monomer unit represented by the general formula (1) contains a hydroxyl group of —CH$_2$CHA-O—H. In this case, the hydroxyl group is a secondary hydroxyl group, so it causes hardly any exchange reaction with the synthetic resin even when it is mixed with the synthetic resin at high temperatures, and does not cause deterioration of the synthetic resin. Therefore, ethylene oxide is added to the polymer (A), then propylene oxide or butylene oxide is added. In the case of a polymerization process of, for example, a random copolymerization between ethylene oxide and propylene oxide, the composition may include the structure of the polymer (A) that constitutes the antistatic composition of the present invention. However, as a polymer having a primary hydroxyl group originated from ethylene oxide is also present at the same time, an exchange reaction with the synthetic resin cannot be prevented.

The low-molecular-weight anionic organic compound (B) to be used in the antistatic composition of the present invention is an organic compound having an acidic group, or a neutralized product obtained from such an organic compound and a basic compound. Examples of organic compounds having an acidic group include organic carboxylic acids such as fatty acid, alkenyl succinic acid, (alkyl-substituted) benzoic acid, (alkyl-substituted) salicylic acid, polyacrylic acid, N-acylmethylaminoacetate, acylated amino acid, or polyoxyalkylene alkyl ether carboxylic acid; organic sulfonic acids such as alkyl sulfonic acid, (alkyl-substituted) benzenesulfonic acid, (alkyl-substituted) phenyl ether disulfonic acid, naphthalenesulfonic acid, formaldehyde condensates of naphthalenesulfonic acid, isethionic acid, isethionate fatty acid ester, alkyl isethionate ether, α-olefin sulfonic acid, α-sulfo fatty acid methyl ester, or sulfosuccinate diester; organic sulfate esters such as alkyl sulfate ester, alkenyl sulfate ester, polyoxyalkylene alkyl ether sulfate ester, polyoxyalkylene alkyl phenyl ether sulfate ester, polyoxyalkylene fatty alkanol amide sulfate ester or sulfo fatty acid ester; and organic phosphate such as acidic alkyl phosphate ester, acidic alkyl phosphorous acid ester, acidic polyoxy alkylene alkyl phosphate ester, or alkyl phosphonic acid. Of those, organic sulfonic acids are most preferable. When any of those organic compounds having an acidic group has a high molecular weight, it may not allow the antistatic compound of the present invention to exert an instantaneous effect. Thus, the organic compound having the acidic group preferably has an average molecular weight of 100 to 500, more preferably 100 to 400.

In addition, the organic compound having the acidic group exerts an antistatic effect even if it is in the form of a free acid. However, it is preferably used as a neutralized product with a basic compound. Examples of the basic compounds include metallic hydroxides or metallic oxides such as lithium hydroxide, sodium hydroxide, potassium hydroxide, magnesium hydroxide, calcium hydroxide, magnesium oxide or calcium oxide; ammonium such as ammonia, methylamine, dimethylamine, ethylamine, diethylamine, (iso)propylamine, di(iso)propylamine, monoethanolamine, N-methylmonoethanolamine, N-ethylethanolamine, diethanolamine, triethanolamine, morpholine, monopropanolamine, dipropanolamine, tripropanolamine, 2-amino-2-methyl-1,3-propanediol, aminoethylethanolamine or N,N,N',N'-tetrakis(2-hydroxypropyl)ethylenediamine; and organic phosphoniums such as tetraphenyl phosphonium or tetrabutyl phosphonium. Of those, in particular, metallic hydroxides or metallic oxides of alkaline metals or alkaline earth metals are preferable, alkaline metals are more preferable, and sodium hydroxide or potassium hydroxide are further preferable.

Examples of those specifically preferable neutralized organic sulfonic acids include sodium decylsulfonate, sodium alkylsulfonate (C9-C13), sodium octadecylsulfonate, sodium p-toluenesulfonate, lithium dodecylbenzenesulfonate, sodium dodecylbenzenesulfonate, potassium dodecylbenzenesulfonate, sodium naphthalenesulfonate, sodium nonylnaphthalene sulfonate, sodium isethionate, sodium laurylesterisethionate, sodiumlaurylether isethionate, sodium olefinsulfide (C12-C14), sodium C16-C18 olefinsulfide, sodium methylester α-sulfostearate, sodium dibutylestersulfosuccinate and sodium di-2-ethylhexylester sulfosuccinate. Of those neutralized organic sulfonic acids, sodium decylsulfonate, sodium C9-C13 alkylsulfonate, sodium octadecylsulfonate and sodium dodecylbenzenesulfonate are particularly preferable.

The antistatic composition of the present invention includes the polymer (A) having the monomer unit represented by the general formula (1) and the anionic organic compound (B) at a mass ratio ((A)/(B)) of preferably 10/90 to 99.5/0.5, more preferably 15/85 to 99/1.

The antistatic composition of the present invention may be directly added to a synthetic resin or may be added thereto after being impregnated into a carrier if required. When impregnating into the carrier, the antistatic composition of the present invention may be directly mixed with the carrier under heating. Alternatively, if required, it may be diluted with an organic solvent and impregnated into the carrier, followed by removal of the solvent. As the carrier, those known as fillers or packing materials for synthetic resins can be used, and examples thereof include calcium silicate powder, silica powder, talc powder, alumina powder and titanium oxide powder. Of those carriers, the silica powder is particularly preferable. For those carriers, those having an average particle size of 0.1 to 100 μm are preferable, and those of 0.5 to 50 μm are more preferable.

The characteristic feature of the synthetic resin composition of the present invention is that the synthetic resin composition is obtained by adding and mixing such antistatic compositions with any of variety of synthetic resins. Examples of the synthetic resins include polyolefin resins such as low-density polyethylene resins, linear low-density polyethylene resins, high-density polyethylene resins, polypropylene resins, polymethylpentene resins, ethylene-propylene copolymer resins, polybutadiene resins or polyisoprene resins; polystyrene resins; polyhaloolefin resins such as polyvinyl chloride resins, polyvinyl vinylidene resins, polychloroprene resins, ethylene-vinyl chloride copolymer resins, vinyl chloride-vinyl acetate copolymer resins, or vinyl chloride-vinylidene chloride copolymer resins; polyester resins such as acrylonitrile-butadiene-styrene copolymer resins (ABS), acrylonitrile-styrene copolymer resins (AS), polyvinyl acetate resins, ethylene-vinyl acetate copolymer resins (EVA), polyvinyl alcohol resins, ethylene-vinyl alcohol copolymer resins, polyvinyl formal resins, polyvinyl butyral resins, polymethyl methacrylate resins, acryl resins, ketone resins, norbornene resins, polyacetal resins, polyamide resins, polyamide imide resins, polyacrylate resins, polyimide resins, polyether imide resins, polyether ketone resins, polyethylene terephthalate resins (PET), polybutylene terephthalate resins (PBT) or polyhexamethylene terephthalate resins; thermoplastic resins such as polycarbonate resins, polysulfone resins, polyphenylene ether resins or polyphenylenesulfide resins; thermosetting resins such as epoxy resins, polyurethane resins, phenol resins, unsaturated polyester resins, polylactate resins, polyimide resins, urea resins, melamine resins, xylene resins, guanamine resins, diallylphthalate resins, vinyl ester resins, furan resins or rhodine-denatured maleic acid resins; silicone resins; fluorine resins such as polyvinyl fluoride or polyvinylidene fluoride; and rubber-based high-molecular compounds such as natural rubbers (NR), polyisoprene rubbers (IR), styrene butadiene rubbers (SBR), polybutadiene rubbers (BR), ethylene-propylene-diene rubbers (EPDM), butyl rubbers (IIR), chloroprene rubbers, acrylonitrile butadiene rubbers (NBR) or silicone rubbers. Polymer alloys that are a combination of those synthetic resins may also be used.

Of those synthetic resins, engineering plastics of which heat-resistance is required are preferable. Polymer alloys using polycarbonate resins such as polycarbonate/ABS resins, polycarbonate/AS resins, polycarbonate/rubber-based high-molecular compound resins or polycarbonate/ABS resins/rubber-based high-molecular compounds are more preferable because they show excellent persistence of the antistatic effects. Preferably, the percentage of polycarbonate resins in the polymer alloys using polycarbonate resins is 50 to 98 percent by mass.

Commercially available polycarbonate resins can be used as the polycarbonate resin of the present invention. For example, the polycarbonate resin of the present invention can be produced by reaction of one or more bisphenols with a phosgene or a diester carbonate. Examples of bisphenols include hydroquinone, 4,4-dihydroxyphenyl, bis-(4-hydroxyphenyl)-alkane, bis-(4-hydroxyphenyl)-cycloalkane, bis-(4-hydroxyphenyl)-sulfide, bis-(4-hydroxyphenyl)-ether, bis-(4-hydroxyphenyl)-ketone, bis-(4-hydroxyphenyl)-sulfone and those substituted with alkyl, aryl or halogen. Those may be used alone or in combinations of two or more. Of those polycarbonate resins, a bisphenol-A-based polycarbonate resin in which 2,2-bis-(4-hydroxyphenyl)propane, the so-called bisphenol-A, is used as a raw material, is preferable because it can be easily obtained in the market. Furthermore, those polycarbonate resins have a viscosity-average molecular weight of 10,000 to 50,000.

The amount of the antistatic composition of the present invention to be mixed with the synthetic resin is not specifically limited. However, an excessive amount of the mixed resin may lead to a decrease in the physical properties, such as mechanical strength of the synthetic resin or difficulty in mixing. If the mixing amount is too small, the antistatic effect may become insufficient. Therefore, the mixing ratio is preferably 0.01 to 20 percent by mass, more preferably 0.05 to 15 percent by mass and most preferably 1 to 10 percent by mass. The mixing method is not specifically limited, and any of the methods commonly used in the art can be employed. For example, the mixing may be performed so that roller-kneading, bumper-kneading, an extruder, a kneader or the like may be used for mixing and kneading.

The antistatic composition of the present invention may be added to and mixed with the synthetic resin together with a flame retardant to prepare the synthetic resin composition, thereby improving the persistence of the antistatic effect of the synthetic resin composition. Examples of flames retardant which can be used in combination include halogen-based flame retardants such as tetrabromobisphenol A, hexabromobenzene, tris(2,3-dibromopropyl) isocyanurate, 2,2-bis(4-hydroxyethoxy-3,5-dibromopropyl)propane, decabromodiphenyl oxide, hexabromocyclodecane, tetrabromophthalic anhydride, polyethylene chloride, paraffin chloride, perchlorocyclopentadecane, chlorendic acid and tetrachlorophthalic anhydride; phosphorus-based flame retardants such as ammonium phosphate, tricresyl phosphate, triethyl phosphate, tris(β-chloroethyl)phosphate, trischloroethyl phosphate, trisdichloropropyl phosphate, cresyldiphenyl phosphate, xylenyldiphenyl phosphate, phenylene bis(diphenyl phosphate), phenylene bis(phenylcresyl phosphate), phenylene bis(dicresyl phosphate), phenylene bis(dixylenyl phosphate), bisphenol A bis(diphenyl phosphate), and bisphenol A bis(dicresyl phosphate); and inorganic flame retardants such as red phosphous, tin oxide, antimony trioxide, zirconium hydroxide, barium metaborate, zinc borate, aluminum hydroxide, magnesium hydroxide and nitrogenized guanidine. As synthetic resin mixed with flame retardants containing halogen, such as halogen-based flame retardants or halogen-containing phosphorous flame retardants, may generate dioxins during combustion, in recent years, there has been a trend forward avoiding halogen-containing flame retardants.

Further, combination of some of the flame retardants and the polymeric antistatic agent of the present invention may lead to thermal colorization of the synthetic resin or a decrease in the thermal-resistance properties thereof, depending on the kind of synthetic resin. As a flame retardant free of the above problems, a phosphorous compound represented by the following general formula (2) is preferable:

[Chemical formula 5]

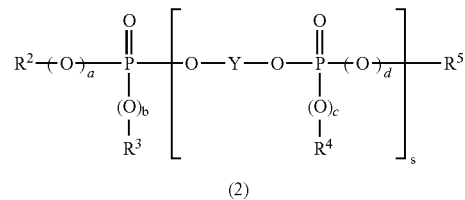

(2)

where $R^2$ to $R^5$ each represent aryl groups, Y represents an allylene group, a to d each represent a numeral of 0 or 1, and s represents a numeral of 1 to 5.

In the general formula (2), $R^2$ to $R^5$ represent aryl groups, which may be the same or different from each other. As the aryl group, the same aryl group in the case of $R^1$ described in the general formula (1) may be exemplified. Of those, phenyl, cresyl and xylenyl are preferable. In addition, Y represents an allylene group. The allylene group is a residue obtained by removing a hydroxyl group from divalent phenols. The divalent phenols include resorcin, catechol, hydroquinone, bisphenol A, bisphenol F, bisphenol S and biphenol. Here, a to d represent a numeral of 0 or 1, which may be the same or different from each other, and s is an average value of a repetitive unit and represents a numeral of 1 to 5.

Further, the phosphorous compound represented by the general formula (2) can be produced by a known method (for example, Japanese Patent Laid-Open No. 59-202240). Specific examples of phosphorous-based compounds represented by the general formula (2) include phenylene bis (diphenyl phosphate), phenylene bis(phenylcresyl phosphate), phenylene bis(dicresyl phosphate), phenylene bis(dixylenyl phosphate), bisphenol A bis(diphenyl phosphate) and bisphenol A bis(dicresyl phosphate). Any of those flame retardants is mixed at an amount of preferably 0.5 to 30 percent by mass, more preferably 1 to 25 percent by mass, most preferably 5 to 20 percent by mass with respect to the amount of a synthetic resin in general, although it cannot be generalized as if changes depending on the kind and use of the synthetic resin to be provided as a substrate.

In addition, the antistatic composition of the present invention can be used in combination with any of other synthetic resin additives within a range that does not disturb the effect of the present invention, including antioxidants, light stabilizers, ultraviolet absorbers, fluoroolefine resins, other antistatic agents, antifog additives, lubricants, plasticizers, coloring agents, flame retardants except those of a phosphorous type, flame-retardant auxiliaries, repellents for ants, crystalline nucleus agents, compatibilizers, anti-blocking agents, foaming agents, inorganic electrocytes, fillers, packing agents, pigments, aromatics, silicon oils and coupling agents. Alternatively, the antistatic composition of the present invention may be mixed with any conductive substance, such as carbon fibers and stainless steel fibers. Of those, it is preferable to combine an antioxidant, a fluoroolefine resin or a lubricant.

Examples of those antioxidants include phenol-based antioxidants, phosphorus-based antioxidants and sulfur-based antioxidants. Examples of phenol-based antioxidants include 2,6-di-tert-butyl phenol (tert-butyl hereinafter abbreviated as t-butyl), 2,6-di-t-butyl-4-methylphenol, 2,6-di-t-butyl-4-ethylphenol, 2,4-dimethyl-6-t-butylphenol, 4,4'-methylene bis (2,6-di-t-butylphenol), 4,4'-bis(2,6-di-t-butylphenol), 4,4'-bis(2-methyl-6-t-butylphenol), 2,2'-methylene bis(4-methyl-6-t-butylphenol), 2,2'-methylene bis(4-ethyl-6-t-butylphenol), 4,4'-butylidene bis(3-methyl-6-t-butylphenol), 4,4'-isopropyledene bis(2,6-di-t-butylphenol), 2,2'-methylene bis(4-methyl-6-cyclohexylphenol), 2,2'-methylene bis (4-methyl-6-nonylphenol), 2,2'-isobutyledene bis(4,6-dimethylphenol), 2,6-bis(2'-hydroxy-3'-t-butyl-5'-methylbenzyl)-4-methylphenol, 3-t-butyl-4-hydroxyanisole, 2-t-butyl-4-hydroxyanisole, 3-(4-hydroxy-3,5-di-t-butylphenyl)stearylpropionate, 3-(4-hydroxy-3,5-di-t-butylphenyl) oleylpropionate, 3-(4-hydroxy-3,5-di-t-butylphenyl)dodecylpropionate, 3-(4-hydroxy-3,5-di-t-butylphenyl) octylpropionate, tetrakis{3-4-hydroxy-3,5-di-t-butylphenyl) propionyloxymethyl}methane, 3-(4-hydroxy-3,5-di-t-butylphenyl)glycerin monoester propionate, ester of 3-(4-hydroxy-3,5-di-t-butylphenyl)propionate and glycerin monooleyl ether, 3-(4-hydroxy-3,5-di-t-butylphenyl)butylene glycol ester propionate, 3-(4-hydroxy-3,5-di-t-butylphenyl)thiodiglycol ester propionate, 4,4'-thiobis(3-methyl-6-t-butylphenol), 4,4'-thiobis(2-methyl-6-t-butylphenol), 2,2'-thiobis(4-methyl-6-t-butylphenol), 2,6-di-t-butyl-α-dimethylamine-p-cresol, 2,6-di-t-butyl-4(N,N'-dimethylaminomethylphenol), bis(3,5-di-t-butyl-4-hydroxybenzyl)sulfide, tris{(3,5-di-t-butyl-4-hydroxyphenyl)propionyl-oxyethyl}isocyanurate, tris(3,5-di-t-butyl-4-hydroxyphenyl)isocyanurate, 1,3,5-tris(3',5'-di-t-butyl-4-hydroxybenzyl)isocyanurate, bis{2-methyl-4-(3-n-alkylthiopropionyloxy)-5-t-butylphenyl}sulfide, 1,3,5-tris (4-di-t-butyl-3-hydroxy-2,6-dimethylbenzyl)isocyanurate, tetraphthaloyl-di(2,6-dimethyl-4-t-butyl-3-hydroxybenzylsulfide), 6-(4-hydroxy-3-5-di-t-butylanilino)-2,4-bis(octylthio)-1,3,5-triazine, 2,2-thio-{diethyl-bis-3-(3,5-di-t-butyl-4-hydroxyphenyl)}propionate, N,N'-hexamethylene bis (3,5-di-t-butyl-4-hydroxy-hydroxyamide), 3,5-di-t-butyl-4-hydroxy-benzyl-diesterphosphate, bis(3-methyl-4-hydroxy-5-t-butylbenzyl)sulfide, 3,9-bis[1,1-dimethyl-2-{β-(3-t-butyl-4-hydroxy-5-methylphenyl)propionyloxy}ethyl]-2,4, 8,10-tetraoxaspiro[5,5]undecane, 1,1,3-tris(2-methyl-4-hydroxy-5-t-butylphenyl)butane, 1,3,5-trimethyl-2,4,6-tris (3,5-di-t-butyl-4-hydroxybenzyl)benzene and bis{3,3'-bis-(4'-hydroxy-3'-t-butyl phenyl)butyric acid}glycol ester.

Examples of phosphor-based antioxidants include triphenyl phosphite, diphenylisodecyl phosphite, phenyldiisodecyl phosphite, 4,4-butylidene bis(3-methyl-6-t-butylphenyl-diisotridecyl)phosphite, distearylpentaerythritol diphosphite, diisodecylpentaerythritol diphosphite, tris(nonylphenyl) phosphite, tris(dinonylphenyl)phosphite, tris(2,4-di-t-butylphenyl)phosphite, bis(2,6-di-t-butyl-4-methylphenyl)pentaerythritol phosphite, 2,2-methylene bis(4,6-di-t-butylphenyl)octyl phosphite, 1,1,3-butylidine tris(3-methyl-6-t-butylphenyldiisotridecyl)phosphite, 2,2-propilidene bis(3-methyl-6-t-butylphenyldiisotridecyl)phosphite, tetrakis(2,4-di-t-butylphenyl)-4,4-biphenylene diphosphite, 9,10-dihydro-9-oxa-10-phosphaphenanthrene-10-oxide, 10-(3,5-di-t-butyl-4-hydroxybenzyl)-9-10-dihydro-9-oxa-10-phosphaphenanthrene-10-oxide and 10-decyloxy-9,10-dihydro-9-oxa-10 phophaphenanthrene.

Examples of sulfur-based antioxidants include dioctylthiodipropionate, didecylthiodipropionate, dilaurylthiodipropionate, dimyristylthiodipropionate, distearylthiodipropionate, laurylstearylthiodipropionate, distearyl-β,β'-thiodibutylate, (3-octylthiopropionate)pentaerythritol tetraester, (3-decylthiopropionate)pentaerythritol tetraester, (3-laurylthiopropionate)pentaerythritol tetraester, (3-stearylthiopropionate)pentaerythritol tetraester, (3-oleylthiopropionate)pentaerythritol tetraester, (3-laurylthiopropionate)-4,4'-thiodi(3-methyl-5-t-butyl-4-phenol)ester, 2-mercaptobenzimidazole, 2-merchaptomethylbenzimidazole, 2-benzimidazole disulfide, dilaurylsulfide and amylthioglycol.

The mixing amount of each of the antioxidants is preferably about 0.001 to 15 percent by mass, more preferably 0.005 to 10 percent by mass, most preferably 0.01 to 5 percent by mass with reference to the amount of synthetic resin although it cannot be generalized as if changes depending on the synthetic resin to be provided as a substrate.

The synthetic resin composition of the present invention preferably contains a fluoroolefine resin. The synthetic resin compositions to which the fluoroolefine resin is added, are difficult to ignite or burn when a fire breaks out, because dripping is prevented at the time of melting. Here, the fluoroolefine resin is a polymer containing a fluoroethylene structure, including difluoroethylene polymers, tetrafluoroethylene polymers, tetrafluoroethylene hexafluoropropylene polymers, and copolymers of tetrafluoroethylene and ethylene-based monomers, which do not contain fluorine. Of those, polytetrafluoroethylene (PTFF) is preferable. A PTFF having an average molecular weight of 500,000 or more is more preferable, and a PTFF having an average molecular weight of 500,000 to 1000,000 is far more preferable. Concrete examples for the PTFF include Teflon (registered trademark) 6-J (manufactured by DuPont-Mitsui Fluorochemicals), Polyflon D-1, Polyflon FA-100, Polyflon F-103, Polyflon F-201, Polyflon MPA (manufactured by Daikin Industries, LTD.) CD076 (manufactured by Asahi-ICI Fluoropolymers, Co., Ltd.) and Argoflon F5 (manufactured by Montefluos). The mixing amount of the fluoroolefine resin is preferably about 0.05 to 5 percent by mass, more preferably 0.1 to 2 percent by mass, and most preferably 0.5 to 1.5 percent by mass with reference to the amount of the synthetic resin although it cannot be generalized because it changes depending on the kind and use of the synthetic resin to be provided as a substrate.

Examples of lubricants which can be used in the present invention include hydrocarbon-based lubricants such as liquid paraffin, paraffin wax, and polyethylene wax; fatty-based lubricants such as stearyl alcohol, stearic acid and 12-hydroxystearic acid; amide-base lubricants such as stearate amide, oleate amide, erucate amide, methylene bisstearate amide and ethylene stearate amide; metal soap-based lubricants such as calcium stearate, zinc stearate, magnesium stearate, lead stearate, aluminum stearate, barium stearate, barium stearate/zinc stearate complexes and zinc stearate/calcium stearate complexes; and ester-based lubricants such as cure fat and oil, glycerin monostearate, butyl stearate, pentaerythritol stearate and stearyl stearate. The mixing amount of any of those lubricants is preferably 0.001 to 15 percent by mass, more preferably about 0.005 to 10 percent by mass, and most preferably 0.01 to 5 percent by mass with reference to the amount of the synthetic resin although it cannot be generalized because it changes depending on the synthetic resin to be provided as a substrate.

Ultraviolet absorbers used in the present invention include benzotriazol-based ultraviolet absorber, benzophenone-based ultraviolet absorber and other ultraviolet absorbers. Examples of benzotriazol-based ultraviolet absorbers include 2-(2'-hydroxy-5'-methylphenyl)benzotriazol, 2-(2'-hydroxy-5'-t-butylphenyl)benzotriazol, 2-(2'-hydroxy-3',5'-di-t-butylphenyl)benzotriazol, 2-(2'-hydroxy-3'-t-butyl-5'-methylphenyl)benzotriazol, 2-{2'-hydroxy-3',5'-bis($\alpha,\alpha$-dimethylbenzyl)phenyl}benzotriazol, 2-(2'-hydroxy-3'-t-butyl-5'-methylphenyl)-5-chlorobenzotriazol, 2-(2'hydroxy-3',5'-di-t-buthylphenyl)-5-chrlorobenzotriazol, 2-(2'-hydroxy-3',5'-di-t-amylphenyl)benzotriazol, 2-(2'-hydroxy-5'-t-ocluphenyl)benzotriazol, 2-{2'-hydroxy-3'-(3",4",5",6"-tetrahydrophthalimidemethyl)-5'-methylphenyl}benzotriazol, 2-2-methylene bis{4-(1,1,3,3-tetramethylbutyl)-6-(2H-benzotriazol-2-il)phenol} and 2-(2'-hydroxy-5'-methacryloxyphenyl)-2H-benzotriazol.

Examples of benzophenone-based ultraviolet absorbers include 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihyroxy-4-methoxybenzophenone, 2,2'-dihyroxy-4,4'-methoxybenzophenone, and 2-hydroxy-4-methoxy-5-sulfobenzophenon and bis(5-benzoyl-4-hydroxy-2-methoxyphenyl methane).

Examples of other ultraviolet absorbers include salicylate-based absorbers such as phenylsalicylate, 4-t-butylphenylsalicylate, and 4-octylphenylsalicylate; cyanoacrylate-based absorbers such as ethyl-2-cyano-3,3-diphenylacrylate and 2-ethylhexyl-2-cyano-3,3-diphenylacrylate; and oxalic acid-based absorbers such as 2-ethoxy-2'-ethyloxalic acid bisanylide.

The mixing amount of any of those ultraviolet absorbers is preferably about 0.001 to 15 percent by mass, more preferably 0.005 to 10 percent by mass, and most preferably 0.01 to 5 percent by mass with reference to the amount of the synthetic resin although it cannot be generalized because it changes depending on the synthetic resin to be provided as a substrate.

Examples of hindered amine-based light stabilizers which may be used in the present invention include bis(2,2,6,6-tetramethyl-4-piperidyl)sebacate, bis(N-methyl-2,2,6,6-tetramethyl-4-piperidyl)sebacate, bis(1,2,2,6,6-pentamethyl-4-piperidyl)-2-(3,5-di-t-butyl-4-hydroxybenzyl)-2-n-butylmalonate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butanetetracarboxylate, (mix-2,2,6,6-tetramethyl-4-piperidyl/tridecyl)-1,2,3,4-butanetetracarboxylate, (mix-1,2,2,6,6-pentamethyl-4-piperidyl/tridecyl)-1,2,3,4-butanetetracarboxylate, mix-{2,2,6,6-tetramethyl-4-piperidyl/$\beta,\beta,\beta',\beta'$-tetramethyl-3,9-(2,4,8,10-tetraoxaspyro[5,5]undecane)diethyl}-1,2,3,4-butanetetracarboxylate, mix-{1,2,2,6,6-pentamethyl-4-piperidyl/$\beta,\beta,\beta',\beta'$-tetramethyl-3,9-(2,4,8,10-tetraoxaspyro[5,5]undecane)diethyl}-1,2,3,4-butanetetracarboxylate, poly{6-(1,1,3,3-tetramethylbutyl)imino-1,3,5-triazine-2,4-diyl}{(2,2,6,6-tetramethyl-4-piperidyl)imino}hexamethylene{(2,2,6,6-tetramethyl-4-piperidyl)imino}, dimethylsuccinate/4-hydroxy-2,2,6,6-tetramethyl-1-piperidine ethanol polymer, 2,2,6,6-tetramethyl-4-piperidyl metacrylate, 1,2,2,6,6-pentamethyl-4-piperidyl metacrylate and ethylene bis(2,2,6,6-tetramethyl-3-oxa-4-piperidine).

Examples of other light stabilizers which may be used in the present invention include nickel-based light stabilizers such as {2,2'-thiobis(4-t-octyl-phenolate)}-2-ethylhexylamine nickel(II), nickel dibutyldithiocarbamate, {2,2'-thiobis(4-t-octyl-phenolate)}-2-butylamine nickel(II), nickel bis (octylphenyl)sulfide and 3,5-di-t-butyl-4-hydroxybenzylphosphate monoethylate nickel complex; and 2,4-di-t-butylphenyl-3,5'-di-t-butyl-4'-hydroxybenzoate.

The mixing amount of any of those light stabilizers is preferably about 0.001 to 15 percent by mass, more preferably 0.005 to 10 percent by mass, and most preferably 0.01 to 5 percent by mass with reference to the amount of the synthetic resin although it cannot be generalized because it changes depending on the kind of the synthetic resin to be provided as a substrate.

Examples of other antistatic compounds which may be used in the present invention include glycerin mono-fatty acid ester, polyglycerin fatty acid ester, diethanolamine fatty acid amide, polyalkyleneglycolalkylether and N-alkyl ammonium chloride. Examples of other additives which may be used in the present invention include nucleating additives such as dibenzylidene sorbitol, bis(p-methyl benzylidene)sorbitol, bis(p-ethylbenzylidene)sorbitol, hydroxy-di-(t-butyl benzoate) aluminum, sodium bis(4-t-butylphenyl)phosphate and sodium 2,2-methylene bis(4,6-di-t-butylphenyl)phosphate; plasticizers such as phthalate ester, dibasic acid ester, chlorinated paraffin, polyester, epoxidized ester, phosphoric acid ester and trimellitic acid ester; metallic soap, organic tin, organic lead, phosphite, epoxide, $\beta$-diketone, polyol, perchlorate, hydrotalcite, stabilizers such as zeolite compound, coloring agents such as titanium compound, calcium silicate powder, silica powder, talc powder, mica powder, alumina powder, titanium oxide powder; and fillers such as glass flake powder.

The antistatic composition of the present invention, which can be obtained by including the polymer (A) containing the monomer unit represented by the above general formula (1) and the anionic organic compound (B) as essential components and optionally adding various kinds of additives, is characterized in that it does not react with a synthetic resin even at the time of kneading at high temperatures when forming and processing various kinds of synthetic resins, and it has excellent antistatic performance and this antistatic effect can be retained for a long time from immediately after it is addition processed to the synthetic resin.

EXAMPLES

Hereinafter, the present invention will be described in more detail with reference to examples of the present invention. Further, in the following examples and so on, the term "part" and "%" mean a mass standard unless otherwise specified. In addition, EO in the polyether structure is an abbreviation of an oxyethylene group, PO is an abbreviation of an oxypropylene group and BO is an abbreviation of an oxygen butylene group. In addition, "-" represents a block copolymer and "/" represents a random copolymer.

Synthesis of Polymer (A)

In a four-necked flask provided with a thermometer, a nitrogen-inducing pipe, a Liebig condenser and an agitator, 212 g of p-cumylphenol, 36 g of para-formaldehyde, 0.3 g of p-toluene sulfonic acid and 100 g of mesitylene (trimethyl benzene) as solvent were introduced, followed by condensation reaction at 120° C. for 5 hours. The resultant reaction product was introduced into a pressurizing reaction device and 1.5 g of potassium hydroxide was then added thereto to allow 660 g of ethylene oxide to be reacted at 140° C. After completely reacting with ethylene oxide, 580 g of propylene oxide was reacted at the same temperature. After terminating the reaction, the solvent, mesitylene, was removed by vacuum distillation and then polyoxyethylene (15) polyoxypropylene (10) p-cumylphenol formaldehyde condensate (A-1) was obtained.

Likewise, A-2 to A-15 were produced with varied reaction conditions and varied amounts of phenols, other components capable of copolymerization, paraformaldehyde, ethylene oxide and propylene oxide introduced. The structures of those compounds are shown in Table 1 below. In addition, the term "condensation degree" represents an average condensation degree obtained by GPC, the term "other components" represents phenol compounds and cocondensed compounds which can be used in the present invention. The "percentages" of A-1 to A-9 represent those of monomer units (mass conversion) represented by the general formula (1) in the polymer (A). In addition, the "percentages" of A-10 to A-14 are all 100% because no cocondensation with other components was carried out.

[Chemical formula 6]

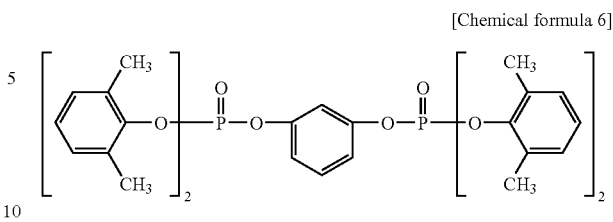

(Asahi Denka Co., Ltd. Product Name: ADK STAB FP-500)

The above samples were mixed at the ratio represented in Table 2 and Table 3 to prepare the antistatic compositions as inventive products and comparative products and those products were then used in various kinds of tests.

TABLE 1

| | $R^1$ | Structure of polyether | Condensation degree | Other components | Percentage (%) |
|---|---|---|---|---|---|
| A-1 | Paracumyl group | $(EO)_{15}$—$(PO)_{10}$—H | 15 | — | 100 |
| A-2 | Paraphenyl group | $(EO)_{15}$—$(PO)_{10}$—H | 10 | — | 100 |
| A-3 | Paraphenethyl group | $(EO)_{15}$—$(PO)_{10}$—H | 8 | — | 100 |
| A-4 | Paracumyl group | $(EO)_{55}$—$(PO)_{20}$—H | 15 | — | 100 |
| A-5 | Paracumyl group | $(EO)_{15}$—$(PO)_{55}$—H | 15 | — | 100 |
| A-6 | Orthophenyl group | $(EO)_{15}$—$(PO)_{10}$—H | 20 | Resorcin | 75 |
| A-7 | Paraphenyl group | $(EO)_{15}$—$(PO)_{10}$—H | 14 | Catecol | 45 |
| A-8 | Methphenethyl group | $(EO)_{15}$—$(BO)_{10}$—H | 12 | — | 100 |
| A-9 | Paracumyl group | $(EO)_{20}$—$(PO)_{10}$—$(BO)_{10}$—H | 15 | — | 100 |
| A-10 | Paracumyl group | $(EO)_{20}$—H | 15 | — | 100 |
| A-11 | Paracumyl group | $(PO)_{10}$—$(BO)_{10}$—H | 12 | — | 100 |
| A-12 | Paraphenyl group | $(EO)_{15}/(PO)_{10}$—H | 18 | — | 100 |
| A-13 | t-butyl group | $(EO)_{15}$—$(PO)_{10}$—H | 15 | — | 100 |
| A-14 | Nonyl group | $(EO)_{10}$—$(EO)_{10}/(PO)_{10}$—H | 15 | — | 100 |

In Table 1, A-12 and A-14 are random copolymers of ethylene oxide and propylene oxide. In other words, each of those is a mixture (comparative product) of a polymer in which the hydrogen end of polyether is ethylene oxide and a polymer made of propylene oxide.

Low Molecular Weight Anion Compound (B)

B-1: Sodium dodecylbenzene sulfonate (Molecular Weight: 348)

B-2: Sodium polyoxyethylene(5)nonylphenolether ester sulfate (Molecular Weight: 542)

Other Components

C-1: Silica powder (TOXIL NP manufactured by Tokuyama)
C-2: Polyoxyethylene(30)nonylphenolether
C-3: Polyethylene glycol (Average Molecular Weight: 6000)
C-4: Glycerin monostearate
C-5: Phenylene bis(dixylenyl phosphate)

TABLE 2

(parts by mass)

| | Inventive Products | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| A-1 | 80 | | | | | | | | | 80 | | 40 | 60 |
| A-2 | | 80 | | | | | | | | | 60 | | |
| A-3 | | | 80 | | | | | | | | | 30 | |
| A-4 | | | | 80 | | | | | | | | | |
| A-5 | | | | | 80 | | | | | | | | |
| A-6 | | | | | | 80 | | | | | | | |

TABLE 2-continued (parts by mass)

| | Inventive Products | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| A-7 | | | | | | | 80 | | | | | | |
| A-8 | | | | | | | | 80 | | | | | |
| A-9 | | | | | | | | | 80 | | | | |
| B-1 | 20 | 20 | 20 | 20 | 20 | 20 | 20 | 20 | 20 | | 40 | 30 | 15 |
| B-2 | | | | | | | | | | 20 | | | |
| C-1 | | | | | | | | | | | | | 25 |

In Table 2, inventive Product 13 was obtained by placing silica powder into a powder-blending mixer (tumbler mixer) and dropping the inventive product (a mixture of A-1 and B-1) into the mixer at 80° C. mixing them together and thereby uniformly impregnating the silica powder with the inventive product. The silica powder used was wet silica prepared by a chemical reaction of silica soda as a raw material in a solution and has an average particle size of 11 μm.

TABLE 3

| | (parts by mass) | | | | | | | | |
|---|---|---|---|---|---|---|---|---|---|
| | Comparative products | | | | | | | | |
| | 1 | 2 | 3 | 4 | 5 | 6 | 7 | 8 | 9 |
| A-1 | 100 | | | | | | | | |
| A-10 | | 80 | | | | | | | |
| A-11 | | | 80 | | | | | | |
| A-12 | | | | 80 | | | | | |
| A-13 | | | | | 80 | | | | |
| A-14 | | | | | | 80 | | | |
| B-1 | | 20 | 20 | 20 | 20 | 20 | 20 | 20 | 20 |
| C-2 | | | | | | | 80 | | |
| C-3 | | | | | | | | 80 | |
| C-4 | | | | | | | | | 80 |

Next, resin compositions were prepared in pellet-form by mixing the various antistatic compositions of inventive products 1 to 13 and the comparative products 1 to 10 with a polyethylene phthalate (PET-G) resin at the ratios described below using an extruder at 20 rpm at 280° C. An injection molding machine was used at 280° C., to form the pellets into molded products each having a diameter of 10 cm and a thickness of 1.5 mm at 280° C. Those molded products were used as test samples and the surface resistance values thereof were then determined by the method described below and their antistatic properties evaluated. Further, the viscosities of the test samples and resin compositions used as raw materials were determined by the method described below, thereby determining the decrease in viscosity of the respective resins due to the addition of various kinds of antistatic compositions.

Furthermore, the bending modulus and heat distortion temperature (HDT) were determined. When resin deteriorates, its bending modulus decreases. The more the thermal-resistance property decreases the more the HDT value decreases. The methods for the respective tests are described below. In addition, all of the evaluation results are given in Table 4.

Compounding Ratio

| Compound | Loads (part) |
|---|---|
| Polyethylene Phthalate (PET)-G | 100 |
| Tetrakis{3-(3,5-di-t-butyl-4-hydroxy phenyl)pro-pionyloximethyl}methane (Adekastub AO-60, anti-oxidant manufactured by Asahi Denka Corp.) | 0.1 |
| Tris(2,4-di-t-butylphenyl)phosphite (Adekastub 2112, anti-oxidant manufactured by Asahi Denka Corp.) | 0.1 |
| Inventive or comparative antistatic compositions | 7 |

<Evaluation of Antistatic Property>

Various test samples were stored at a temperature of 23° C. and a humidity of 50% and the surface specific resistance of those test samples were measured under the conditions described below after 10 minutes from the molding process and after storing for 7 days. Here, the test sample after storing for 7 days was immersed in running water for 30 minutes, air-dried, then the surface specific resistance measured.

Measuring device: the digital extra-high resistance meter R8340 manufactured by

ADVANTEST

Measuring temperature: 23° C.
Measuring humidity: 50%
Applied voltage: 500V
Applied time period: 1 minute <Evaluation of Deterioration of Resin by Measurement of Viscosity Average Molecular Weight>

The viscosity average molecular weight referred to in the present invention is calculated as follows: At first, specific viscosity ($\eta_{sp}$), which is calculated from the equation mentioned below, is obtained using an Ostwald viscometer from a sample solution in which 0.7 g of any of the various resin compositions is dissolved in 100 ml of chloroform at 25° C.

Specific viscosity $(\eta_{sp})=(t-t_0)/t_0$

[$t_0$ is the number of seconds in which the chloroform is dropped and t is the number of seconds in which the test solution is dropped]

Subsequently, from the specific viscosity ($\eta_{sp}$), the viscosity average molecular weight M of each resin composition was calculated from the following equation:

$\eta_{sp}/c=[\eta]+0.45\cdot[\eta]^2 c$ (but [η] is limiting viscosity, c=0.7)

$[\eta]=1.20\cdot 10^{-5} M^{0.82}$

Various viscosity average molecular weights thus obtained were evaluated as molecular ratios before and after the addition of antistatic agents using the following equation. The closer the viscosity ratio is to 1 the less the resin deteriorates.

Viscosity Ratio=Viscosity Average Molecular Weight after the Addition of Antistatic Agent/Viscosity Average Molecular Weight Before the Addition of Antistatic Agent.

<Method of Determining Bending Modulus (MPa)>

Each of the various resin compositions was molded to a test sample having a length of 110 mm, a width of 12 mm and a thickness of 6.5 mm, and the bending modulus (MPa) thereof was then determined on the basis of the test method of ASTM D790 under the conditions of a bending rate of 15 mm/min. and a test temperature of 23° C.

<Method of Determining Heat Distortion Temperature (HDT)>

Each of various resin composition was molded to a test sample having a length of 110 mm, a width of 12 mm and a thickness of 4 mm, and the heat distortion temperature (HDT) was then determined using a HDT-measuring device (HDT-measuring device 3A-2, manufactured by TOYO SEIKI KOGYO CO., LTD.) on the basis of ASTM D648. Here, the test was conducted under conditions in which the load was 0.46 MPa and the temperature-rising rate was 2° C./min.

TABLE 4

| | | Surface specific resistance (Ω/□) | | Viscosity ratio | Bending modulus (MPA) | HDT (° C.) |
|---|---|---|---|---|---|---|
| | | 10 min. after molding | 7 days after molding | | | |
| Inventive Products | 1 | $8.2 \times 10^{12}$ | $2.3 \times 10^{12}$ | 0.98 | 2800 | 65 |
| | 2 | $9.0 \times 10^{12}$ | $2.6 \times 10^{12}$ | 0.97 | 2700 | 64 |
| | 3 | $8.6 \times 10^{12}$ | $2.4 \times 10^{12}$ | 0.98 | 2800 | 64 |
| | 4 | $9.2 \times 10^{12}$ | $6.3 \times 10^{12}$ | 0.97 | 2800 | 61 |

TABLE 4-continued

|  |  | Surface specific resistance ($\Omega/\square$) | | Viscosity ratio | Bending modulus (MPA) | HDT (°C.) |
|---|---|---|---|---|---|---|
|  |  | 10 min. after molding | 7 days after molding | | | |
|  | 5 | $9.1 \times 10^{12}$ | $5.3 \times 10^{12}$ | 0.98 | 2700 | 60 |
|  | 6 | $8.8 \times 10^{12}$ | $4.3 \times 10^{12}$ | 0.98 | 2700 | 63 |
|  | 7 | $8.7 \times 10^{12}$ | $7.3 \times 10^{12}$ | 0.97 | 2800 | 62 |
|  | 8 | $8.8 \times 10^{12}$ | $2.7 \times 10^{12}$ | 0.98 | 2800 | 65 |
|  | 9 | $8.4 \times 10^{12}$ | $2.6 \times 10^{12}$ | 0.97 | 2800 | 65 |
|  | 10 | $1.2 \times 10^{13}$ | $2.4 \times 10^{12}$ | 0.97 | 2700 | 64 |
|  | 11 | $9.4 \times 10^{12}$ | $3.3 \times 10^{12}$ | 0.97 | 2700 | 63 |
|  | 12 | $8.6 \times 10^{12}$ | $2.8 \times 10^{12}$ | 0.98 | 2800 | 65 |
|  | 13 | $9.0 \times 10^{12}$ | $2.9 \times 10^{12}$ | 0.98 | 2800 | 65 |
| Comparative products | 1 | $4.5 \times 10^{15}$ | $2.6 \times 10^{12}$ | 0.98 | 2700 | 65 |
|  | 2 | $9.0 \times 10^{12}$ | $2.6 \times 10^{12}$ | 0.86 | 1600 | 57 |
|  | 3 | $8.9 \times 10^{15}$ | $8.8 \times 10^{15}$ | 0.98 | 2700 | 61 |
|  | 4 | $8.6 \times 10^{12}$ | $3.6 \times 10^{12}$ | 0.89 | 1800 | 58 |
|  | 5 | $8.6 \times 10^{12}$ | $3.6 \times 10^{12}$ | 0.97 | 2700 | 48 |
|  | 6 | $8.5 \times 10^{12}$ | $3.5 \times 10^{12}$ | 0.88 | 1800 | 46 |
|  | 7 | $8.5 \times 10^{12}$ | $1.8 \times 10^{13}$ | 0.85 | 1500 | 41 |
|  | 8 | $9.1 \times 10^{12}$ | $2.8 \times 10^{15}$ | 0.76 | 1400 | 39 |
|  | 9 | $9.5 \times 10^{12}$ | $1.2 \times 10^{13}$ | 0.98 | 2700 | 40 |
| Blank |  | $5.0 \times 10^{16}$ | $5.0 \times 10^{16}$ | 1.0 | 2900 | 67 |

In Table 4, the blank is obtained without the addition of any antistatic composition.

Furthermore, using any of the various antistatic compositions of inventive products 1 to 13 and comparative products 1 to 10, a polycarbonate/ABS resin was mixed at the ratio described below and a resin composition was then formed into pellets by an extruder at 25 rpm at 260° C. The pellet was processed using an injection-molding machine at 260° C., thereby obtaining a molded product having a diameter of 10 cm and a thickness of 2.5 mm at 260° C. The resulting molded products were used as test samples and subjected to the same test as that of Example 1. All of the evaluation results are given in Table 5.

Compounding Ratio

| Compound | Loads (part) |
|---|---|
| Polycarbonate/ABS resin | 100 |
| Tetrakis{3-(3,5-di-t-butyl-4-hydroxy phenyl)propionyloximethyl}methane (Adekastub AO-60, anti-oxidant manufactured by Asahi Denka Corp.) | 0.1 |
| Tris(2,4-di-t-butylphenyl)phosphite (Adekastub 2112, anti-oxidant manufactured by Asahi Denka Corp.) | 0.1 |
| C-5 | 10 |
| Inventive or comparative antistatic compositions | 4 |

The polycarbonate/ABS resin is a polymer alloy having a polycarbonate/ABS ratio of 8/2, where the viscosity average molecular weight of polycarbonate is 20,000.

TABLE 5

|  |  | Surface specific resistance ($\Omega/\square$) | | Viscosity ratio | Bending modulus (MPA) | HDT (°C.) |
|---|---|---|---|---|---|---|
|  |  | 10 min. after molding | 7 days after molding | | | |
| Inventive Products | 1 | $5.6 \times 10^{12}$ | $1.4 \times 10^{12}$ | 0.99 | 2500 | 122 |
|  | 2 | $6.1 \times 10^{12}$ | $1.8 \times 10^{12}$ | 0.98 | 2400 | 121 |
|  | 3 | $5.8 \times 10^{12}$ | $1.5 \times 10^{12}$ | 0.98 | 2500 | 120 |
|  | 4 | $5.9 \times 10^{12}$ | $4.2 \times 10^{12}$ | 0.97 | 2500 | 119 |

TABLE 5-continued

|  |  | Surface specific resistance ($\Omega/\square$) | | Viscosity ratio | Bending modulus (MPA) | HDT (°C.) |
|---|---|---|---|---|---|---|
|  |  | 10 min. after molding | 7 days after molding | | | |
|  | 5 | $5.8 \times 10^{12}$ | $4.8 \times 10^{12}$ | 0.98 | 2400 | 117 |
|  | 6 | $5.9 \times 10^{12}$ | $2.8 \times 10^{12}$ | 0.98 | 2500 | 120 |
|  | 7 | $6.0 \times 10^{12}$ | $6.4 \times 10^{12}$ | 0.98 | 2400 | 119 |
|  | 8 | $5.8 \times 10^{12}$ | $1.5 \times 10^{12}$ | 0.97 | 2500 | 122 |
|  | 9 | $5.9 \times 10^{12}$ | $1.7 \times 10^{12}$ | 0.99 | 2500 | 121 |
|  | 10 | $8.7 \times 10^{13}$ | $1.5 \times 10^{12}$ | 0.97 | 2400 | 122 |
|  | 11 | $5.4 \times 10^{12}$ | $2.0 \times 10^{12}$ | 0.98 | 2500 | 121 |
|  | 12 | $5.6 \times 10^{12}$ | $1.9 \times 10^{12}$ | 0.99 | 2400 | 120 |
|  | 13 | $5.7 \times 10^{12}$ | $1.8 \times 10^{12}$ | 0.98 | 2500 | 120 |
| Comparative products | 1 | $5.9 \times 10^{15}$ | $2.0 \times 10^{12}$ | 0.97 | 2400 | 120 |
|  | 2 | $6.2 \times 10^{12}$ | $2.1 \times 10^{12}$ | 0.88 | 1500 | 113 |
|  | 3 | $6.6 \times 10^{15}$ | $9.5 \times 10^{15}$ | 0.97 | 2500 | 119 |
|  | 4 | $6.1 \times 10^{12}$ | $1.9 \times 10^{12}$ | 0.89 | 1600 | 117 |
|  | 5 | $7.2 \times 10^{12}$ | $3.1 \times 10^{12}$ | 0.97 | 2400 | 98 |
|  | 6 | $7.1 \times 10^{12}$ | $3.0 \times 10^{12}$ | 0.88 | 1600 | 97 |
|  | 7 | $9.2 \times 10^{12}$ | $6.1 \times 10^{12}$ | 0.86 | 1500 | 94 |
|  | 8 | $6.2 \times 10^{12}$ | $9.8 \times 10^{15}$ | 0.78 | 1300 | 88 |
|  | 9 | $6.1 \times 10^{12}$ | $1.1 \times 10^{14}$ | 0.98 | 2400 | 92 |
| Blank |  | $1.8 \times 10^{16}$ | $1.8 \times 10^{16}$ | 1.0 | 2600 | 132 |

From the above results, it was found that the products having a primary hydroxyl group on the end of the polyoxyalkyl chain had a lower viscosity average molecular weight and the resin decomposed into large-scale components. In addition, the bending elastic modulus of the resin decreased as the resin decomposed. Furthermore, it was also found that those products without a benzene ring in the $R^1$ structure had poor heat stability and that the HDT value decreased greatly.

Next, the PET-G and the polycarbonate/ABS resin, which were used in the previous test, were used in preparing test pieces with the compositions as described below and stored in an incubator at a temperature of 25° C. and a humidity of 50%. Test pieces from 7 days and 1 year after the molding were immersed into running water for 30 minutes, air-dried, and then their surface specific resistances were measured. Here, the test samples were of 10 cm in diameter and 2.5 mm in thickness and prepared under the same manufacturing conditions as those of the respective resins previously described. The results are given in Table 6.

Compounding Ratio

| Compound | Loads (part) |
|---|---|
| Resin (PET-G or Polycarbonate/ABS resin) | 100 |
| Tetrakis{3-(3,5-di-t-butyl-4-hydroxy phenyl)propionyloximethyl}methane (Adekastub AO-60, anti-oxidant manufactured by Asahi Denka Corp.) | 0.1 |
| Tris(2,4-di-t-butylphenyl)phosphite (Adekastub 2112, anti-oxidant manu-factured by Asahi Denka Corp.) | 0.1 |
| C-5 | 10 |
| Inventive or comparative antistatic compositions | 4 |

TABLE 6

|  |  | Surface resistance ($\Omega$/□) | | | |
|---|---|---|---|---|---|
|  |  | PET-G resin | | Polycarbonate/ABS resin | |
|  |  | 7 days after molding | 1 year after molding | 7 days after molding | 1 year after molding |
| Inventive products | 1 | $2.3 \times 10^{12}$ | $2.1 \times 10^{13}$ | $1.4 \times 10^{12}$ | $2.5 \times 10^{12}$ |
|  | 2 | $2.6 \times 10^{12}$ | $1.8 \times 10^{\circ}$ | $1.8 \times 10^{12}$ | $3.3 \times 10^{12}$ |
|  | 3 | $2.4 \times 10^{12}$ | $1.9 \times 10^{13}$ | $1.5 \times 10^{12}$ | $6.2 \times 10^{12}$ |
|  | 4 | $6.2 \times 10^{12}$ | $2.1 \times 10^{14}$ | $4.2 \times 10^{12}$ | $1.2 \times 10^{13}$ |
|  | 5 | $5.2 \times 10^{12}$ | $1.7 \times 10^{14}$ | $4.8 \times 10^{12}$ | $1.5 \times 10^{13}$ |
|  | 6 | $4.3 \times 10^{12}$ | $5.1 \times 10^{13}$ | $2.8 \times 10^{12}$ | $5.5 \times 10^{12}$ |
|  | 7 | $7.2 \times 10^{12}$ | $6.1 \times 10^{13}$ | $6.4 \times 10^{12}$ | $1.1 \times 10^{13}$ |
|  | 8 | $2.7 \times 10^{12}$ | $3.4 \times 10^{13}$ | $1.5 \times 10^{12}$ | $1.9 \times 10^{12}$ |
|  | 9 | $2.6 \times 10^{12}$ | $4.3 \times 10^{13}$ | $1.7 \times 10^{12}$ | $2.3 \times 10^{12}$ |
|  | 10 | $2.4 \times 10^{12}$ | $1.1 \times 10^{14}$ | $1.5 \times 10^{12}$ | $1.8 \times 10^{13}$ |
|  | 11 | $3.3 \times 10^{12}$ | $4.2 \times 10^{13}$ | $2.0 \times 10^{12}$ | $5.0 \times 10^{12}$ |
|  | 12 | $2.8 \times 10^{12}$ | $2.6 \times 10^{13}$ | $1.9 \times 10^{12}$ | $5.0 \times 10^{12}$ |
|  | 13 | $2.9 \times 10^{12}$ | $7.6 \times 10^{13}$ | $1.8 \times 10^{12}$ | $4.2 \times 10^{12}$ |
| Comparative products | 2 | $2.6 \times 10^{12}$ | $2.5 \times 10^{15}$ | $2.1 \times 10^{12}$ | $5.2 \times 10^{14}$ |
|  | 4 | $3.6 \times 10^{12}$ | $6.1 \times 10^{15}$ | $1.9 \times 10^{12}$ | $2.1 \times 10^{14}$ |
|  | 6 | $3.5 \times 10^{12}$ | $4.8 \times 10^{15}$ | $3.0 \times 10^{12}$ | $3.3 \times 10^{14}$ |
| Blank |  | $5.0 \times 10^{16}$ | $5.0 \times 10^{16}$ | $1.8 \times 10^{16}$ | $1.8 \times 10^{16}$ |

From the above-mentioned long-term storage test, it was found that those products having a primary hydroxyl group on the end of the structure (comparative products 2, 4 and 6) had a long-term persistence problem. On the other hand, it was confirmed that the antistatic composition of the present invention shows long-term persistence in its antistatic effect. Furthermore, it was confirmed that the synthetic resin composition containing the polycarbonate of the present invention shows excellent long-term persistence in its antistatic effect, compared with other resins.

The invention claimed is:

1. An antistatic composition, comprising:
a polymer (A) containing a monomer unit represented by the following general formula (1):

[Chemical formula 1]

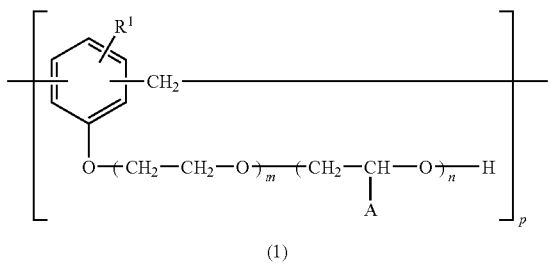

(1)

where $R^1$ represents a hydrocarbon group having a benzene ring, A represents a methyl group or an ethyl group, and a plurality of A's may be the same or different from each other, m and n, each of which is an average polymerization degree of an oxyalkylene group, each represent a numeral of 1 or more, and p represents a numeral of 2 or more; and
a low-molecular-weight anionic compound (B).

2. The antistatic composition according to claim 1, wherein $R^1$ comprises a phenyl group, a cumyl group, or a phenethyl group.

3. The antistatic composition according to claim 1, wherein a value of m is a numeral of 5 to 50 and a value of n is a numeral of 3 to 30.

4. The antistatic composition according to claim 1, wherein a percentage of the monomer unit represented by the general formula (1) with respect to a total amount of the polymer (A) is 30 percent by mass or more.

5. The antistatic composition according to claim 1, wherein the low-molecular-weight anionic compound (B) comprises an organic compound with an average molecular weight of 500 or less having an acidic group selected from organic carboxylic acid, organic sulfonic acid, organic sulfonate ester, or organic phosphate ester, or a neutralized product thereof with a basic compound.

6. The antistatic composition according to claim 1, wherein a ratio of the polymer (A) and the low-molecular-weight anionic compound (B) is (A)/(B)=10/90 to 99.5/0.5 in terms of mass ratio.

7. The antistatic composition according to claim 1, wherein the polymer (A) and the low-molecular-weight anionic compound (B) are impregnated in a carrier.

8. A synthetic resin composition, which is obtained by adding the antistatic composition according to claim 1 to a synthetic resin.

9. A synthetic resin composition, which is obtained by adding to a synthetic resin the antistatic composition according to claim 1, and a phosphorus compound (C) represented by the following general formula (2):

[Chemical formula 2]

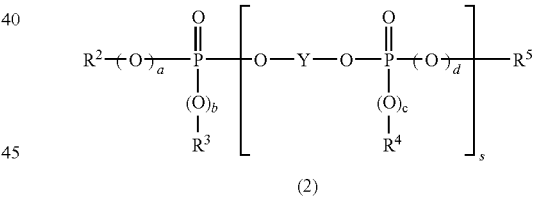

(2)

where $R^2$ to $R^5$ each represent an aryl group, Y represents an allylene group, a to d represent a numeral of 0 or 1, and s represent a numeral of 1 to 5.

10. The synthetic resin composition according to claim 8, wherein 50 to 100 percent by mass of the synthetic resin comprises a polycarbonate resin.

* * * * *